United States Patent [19]

McLin

[11] Patent Number: 4,556,187
[45] Date of Patent: Dec. 3, 1985

[54] BATTERY BOX HOLD-DOWN
[75] Inventor: Marvin R. McLin, Wellston, Okla.
[73] Assignee: Lynn McWhorter, Wellston, Okla.
[21] Appl. No.: 568,059
[22] Filed: Jan. 4, 1984
[51] Int. Cl.[4] ............................................. A47B 97/00
[52] U.S. Cl. ..................................... 248/503; 248/552
[58] Field of Search ............... 248/500, 551, 552, 553, 248/503, 506, 507, 154, 510; 180/68.5; 224/42.39, 42.4, 42.38, 42.45, 282; 70/258; 296/37.6

[56] References Cited

U.S. PATENT DOCUMENTS

| Re. 25,480 | 11/1963 | Merkle | 180/68.5 |
|---|---|---|---|
| 941,608 | 11/1909 | Benson . | |
| 1,075,569 | 10/1913 | Holtzhouser . | |
| 1,537,562 | 5/1925 | Stock | 16/266 |
| 1,734,645 | 11/1929 | Polland . | |
| 1,745,050 | 1/1930 | Romine | 410/120 |
| 1,785,982 | 12/1930 | Scott . | |
| 1,911,401 | 5/1933 | Scott . | |
| 2,529,432 | 11/1950 | Tenner | 70/232 |
| 2,635,939 | 4/1953 | Obenchain | 312/100 |
| 2,791,898 | 5/1957 | Pegg et al. | 70/230 |
| 2,994,395 | 8/1961 | Hall | 180/68.5 |
| 3,741,815 | 6/1973 | Peterson | 136/166 |
| 3,815,388 | 6/1974 | Nichol et al. | 70/63 |
| 4,008,356 | 2/1977 | Asano | 429/98 |
| 4,098,366 | 7/1978 | Reinhard et al. | 180/68.5 |
| 4,249,403 | 2/1981 | Littlejohn | 70/230 |
| 4,367,572 | 1/1983 | Zielenski | 24/301 |

FOREIGN PATENT DOCUMENTS

| 824443 | 7/1949 | Fed. Rep. of Germany . | |
|---|---|---|---|
| 879978 | 12/1942 | France . | |
| 1102821 | 5/1955 | France . | |
| 118787 | 9/1918 | United Kingdom | 224/42.38 |
| 167387 | 8/1921 | United Kingdom | 224/42.38 |
| 182306 | 7/1922 | United Kingdom | 224/42.35 |

OTHER PUBLICATIONS

Modern Plastics, Feb. 1943, p. 21—advertisement Hercules Powder Company.

Primary Examiner—J. Franklin Foss
Attorney, Agent, or Firm—Dunlap, Codding & Peterson

[57] ABSTRACT

A battery box hold-down comprising three metal strips. One metal strip is attached by one end to a base and has a slip-joint hinge component at the second end. Another metal strip is attached by one end to a base and has a hasp component at the second end. The top metal strip, shaped to fit over the top of the battery box, has a slip-joint hinge component at one end and a hasp component at another end. When the top metal strip engages over the battery box, the attached metal strips by slip-joint and hasp and a lock is fixed through the hasp, the battery box is fixed in a secure position.

The battery may be serviced by unlocking the lock and disengaging and removing the top metal strip and the battery box top.

8 Claims, 5 Drawing Figures

BATTERY BOX HOLD-DOWN

BACKGROUND OF THE INVENTION

Since the advent of increasing trailer usage, wet-cell batteries usable for trailer electrical systems have often been mounted on the trailer tongue. These mounted batteries are usually emplaced in a battery box for protection from the elements. The battery box, usually plastic, should be secured to minimize vibrations and also to deter theft of the battery enclosed therein while still permitting access for battery maintenance.

Generally related developments concerning the retention of batteries have included: U.S. Pat. Nos. 2,791,898 and 4,249,403 which disclosed means for locking batteries to associated mounting brackets, as well as U.S. Pat. Nos. 1,734,645; 1,911,401; 2,994,395; 4,098,366; 4,367,572 and U.S. Pat. No. Re. 25,480, which disclosed various means of retaining batteries in position.

Important objectives of the present invention include the positioning and secure locking by a convenient and efficient hold-down device of a battery held within a battery box mounted on a platform.

SUMMARY OF THE INVENTION

A battery box hold-down for securing a battery box to a base, the device comprising a first metal strip with a shape congruous to one side of the battery box and comprising an inside surface, a first end attachable to the base and a second end; a slip-joint hinge comprising two reversibly joinable components, a first component being attached near the second end of the first metal strip; a second metal strip with a shape congruous to a top of the battery box and comprising an inside surface, a first end having a second component of the slip-joint hinge attached nearto to facilitate the reversible engagement of the first metal strip with the second metal strip, and a second end; a hasp being attached near the second end of the second metal strip; and a third metal strip with a shape congruous to a second side of the battery box and comprising an inside surface, an outside surface, a first end with a hasp staple attached nearby to facilitate a sliding engagement of the second metal strip with the third metal strip, and a second end attachable to the base. When the hasp staple and eye are slidingly engaged and a padlock shackle inserted through the staple and locked therein, the battery box is secured to minimize vibration and deter theft.

DETAILED DESCRIPTION OF THE PREFERRED EMBODIMENT

Figure 1:
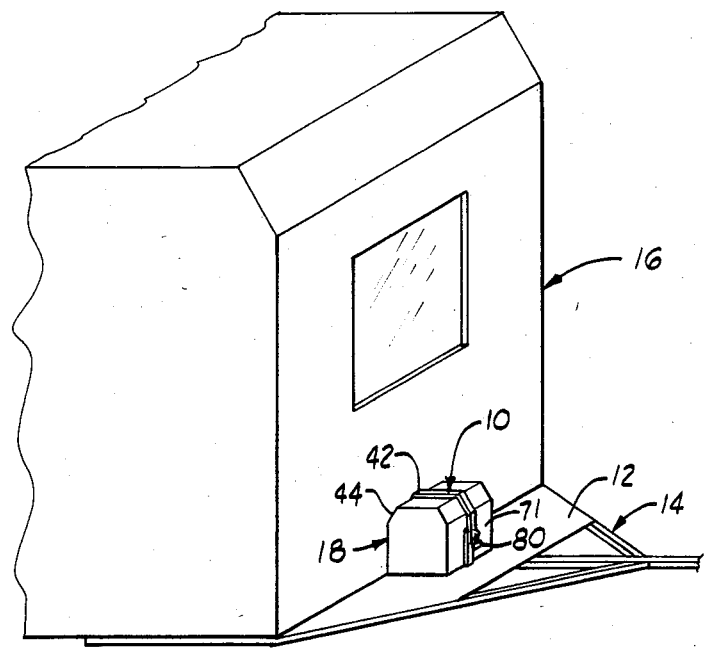
FIG. 1 is a partial perspective view of the front of a trailer with a battery box secured by the present invention to a base.

The battery box hold-down, generally designated by the numeral 10, is seen in FIG. 1 as installed on a base 12 affixed to the front tongue 14 of a trailer 16 and securing a battery box 18 to the base 12.

Figure 2:
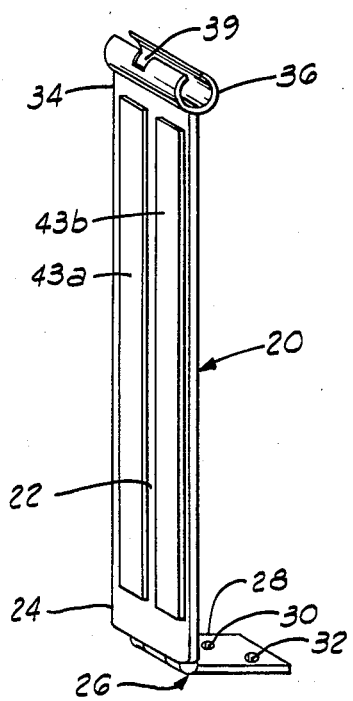
FIG. 2 is a perspective view of the first metal strip of the present invention.
Figure 5:
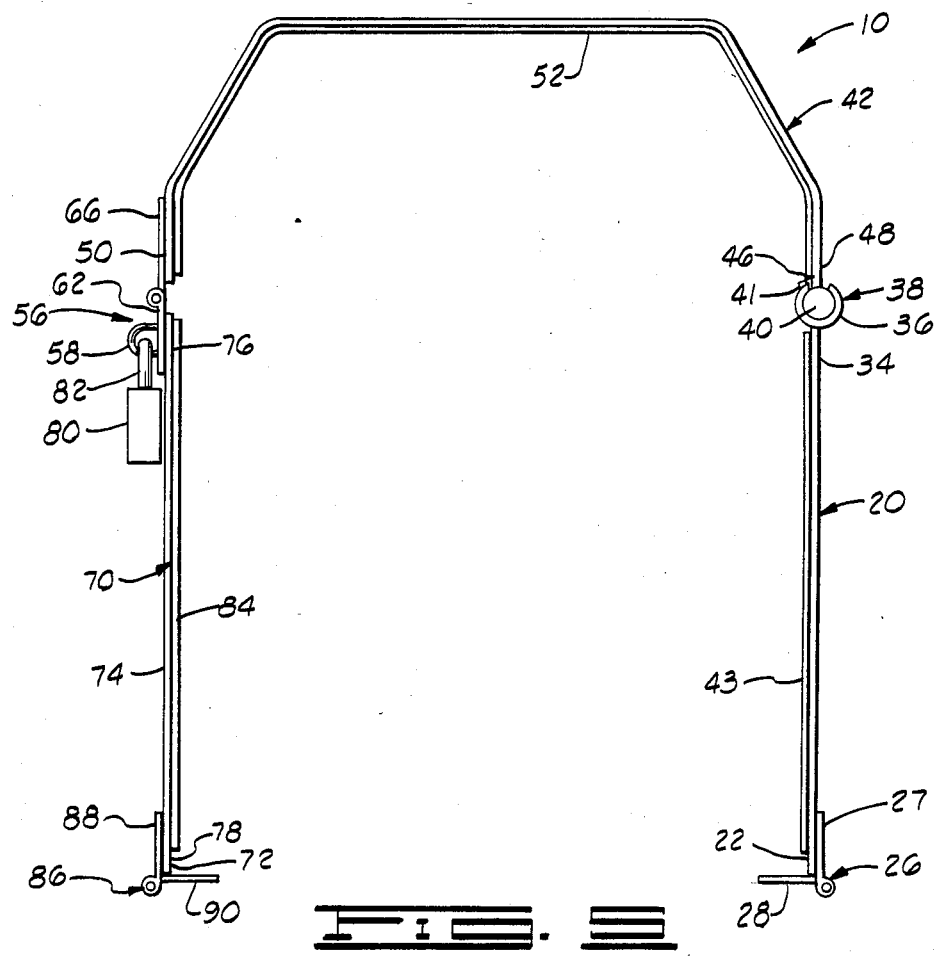
FIG. 5 is a side elevational view of the assembled present invention.

Comprising the battery box hold-down 10 is a first metal strip 20 seen in FIG. 2 and FIG. 5. The first metal strip 20 has a shape congruous to one side (not shown) of the battery box 18, this being linear or flat in this particular embodiment. The first metal strip 20 comprises an inside surface 22, a first end 24 attachable to a base 12, in this embodiment by a hinge 26 having one leaf 27 attached to the first metal strip 20 and a second leaf 28 with perforations 30, 32, to facilitate hinged attachability of the first end 24 of the first metal strip 20 to the base 12. When the first metal strip 20 is hingedly attached to the base 12, it may be moved to facilitate battery box 18 emplacement and removal.

The first metal strip 20 also has a second end 34. Attached to the second end 34 of the first metal strip 20 is a first component 36 of a slip-joint hinge 38, the slip-joint hinge 38 comprising two reversibly joinable components 36, 40 (see also FIG. 3 and FIG. 5 in addition to FIG. 2). The slip-joint hinge 38 facilitates the reversible assembly of the battery box hold-down 10, as is discussed subsequently herein.

The first component 36 of the slip-joint hinge 38 is a laterally disposed socket and has a crevice 39 adapted to receive a peg 41 described subsequently herein whereby the slip-joint hinge 38 is fixed in an engaged position.

The inside surface 22 of the first metal strip 20 has a layering 43a, 43b, of flexible shock-absorbent material, preferably a polymeric organic material glued in position.

Figure 3:
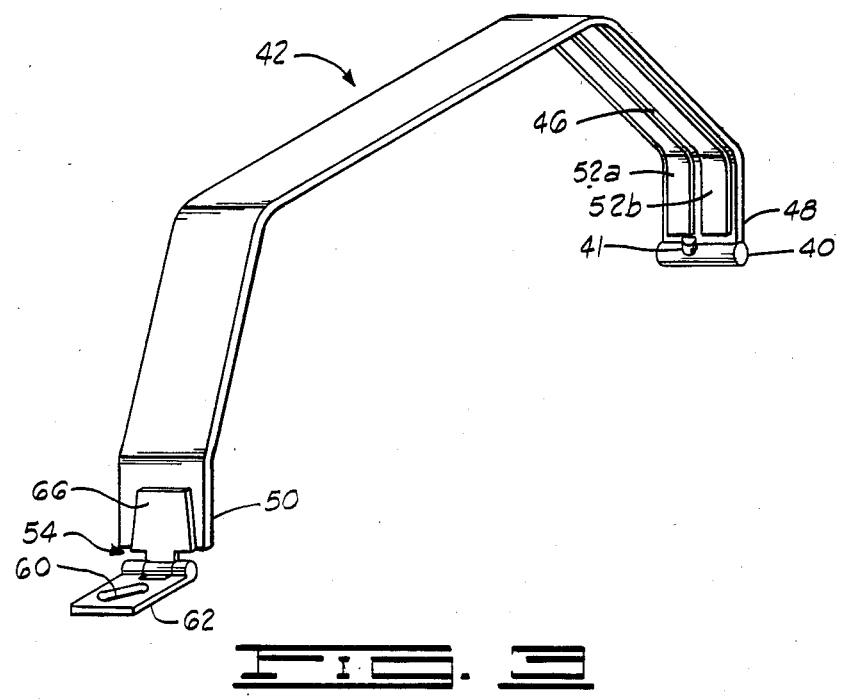
FIG. 3 is a perspective view of the second metal strip of the present invention.

Seen most clearly in FIG. 3, but also FIGS. 1 and 5, is a second metal strip 42. The second metal strip 42 has a shape congruous to a top 44 of the battery box 18 and comprises an inside surface 46, a first end 48 and a second end 50. The first end 48 of the second metal strip 42 has a second component 40 of the slip-joint hinge 38 attached nearby to facilitate the reversible engagement of the first metal strip 20 with the second metal strip 42. The second component 40 of the slip-joint hinge 38 is a laterally disposed pintle having a peg 41 insertable in the crevice 39 of the first component 36 of the slip-joint hinge to laterally fix the slip-joint hinge 38 in an engaged position.

The inside surface 46 of the second metal strip 42 has a layering 52a, 52b, of flexible shock-absorbent material, preferably a polymeric organic material glued in position.

Attached near the second end 50 of the second metal strip 42 is a hasp 54. The hasp 54 comprises a hinged hasp eye 60, this eye 60 being a slotted aperture in a first hasp hinge leaf 62 of the hasp 54. A second hasp hinge leaf 66 is attached to the second metal strip 42 near the second end 50 thereof. The hinging connection of the first hasp hinge leaf 62 and the second hasp hinge leaf 60 results in the hasp eye 60 being hingedly attached near the second end 50 of the second metal strip 42.

Figure 4:
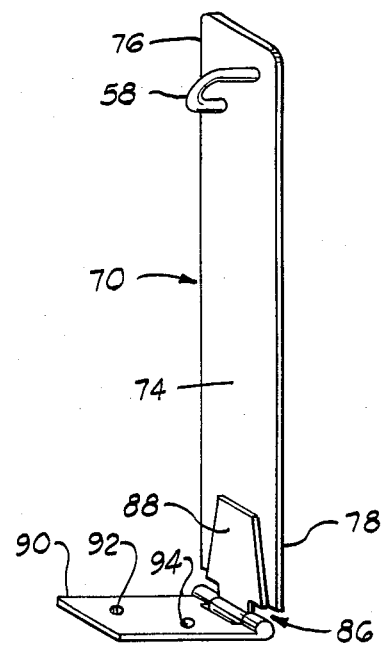
FIG. 4 is a perspective view of the third metal strip of the present invention.

The third metal strip 70, seen most clearly in FIG. 4, but also in FIG. 5, has a shape congruous to a second side 71 of the battery box 18, and comprises an inside surface 72, an outside surface 74, a first end 76 and a second end 78. Attached near the first end 76 of the third metal strip 70 and on the outside surface 74 thereof is a hasp staple 58. This hasp staple 58 is sized and situated to allow a sliding engagement through the eye 60 of the hasp 54 and facilitate the locking engagement of a padlock 80 shackle 82 as seen in FIG. 5. The inside surface 72 of the third metal strip 70 has a layering 84 of flexible shock-absorbent material similar to that described earlier herein.

The second end 78 of the third metal strip 70 is attachable to the base 12, in this embodiment by a hinge 86 comprising a first leaf 88 attached near the second end 78 of the third metal strip 70 and a second leaf 90 with perforations 92, 94, to facilitate the hinged attachability of the third metal strip 70 to the base 12 and allow battery box 18 emplacement and removal.

In actual operation of the battery box hold-down 10, the first metal strip 20 and the third metal strip 70 are attached by their hinges 26, 86, with screws, bolts or welding, for example, to the base 12 so that the first metal strip 20 is near the trailer 16 and also so that the inside surfaces 22, 72 of the metal strips 20, 70 face each other and are spaced apart a distance about equal to the width of the battery box 18. The two attached metal strips 20, 70 are hingedly tilted to permit emplacement of the battery box 18 and battery (not shown) together or sequentially on the base 12 and between the attached metal strips 20, 70. The battery box 18 is emplaced on the base 12 between the attached metal strips 20, 70.

The second metal strip 42 is then positioned so that the peg 41 of the second component 40 of the slip-joint hinge 38 is upwardly disposed and the pintle or second component 40 of the slip-joint hinge 38 which is attached to the second metal strip 42 is laterally slid into the socket or first component 36 of the slip-joint hinge 38 attached to the first metal strip 20 until the peg 41 is aligned with the crevice 39 of the first component 36 of the slip-joint hinge 38. The second metal strip 42 is then tilted toward the battery box 18 until the peg 41 is engaged by the crevice 39 to forestall lateral movement of the slip-joint hinge 38 and also to place the hasp 54 and hasp staple 58, in engagable proximity.

The hasp staple 58 attached to the third metal strip 70 is then slidingly engaged through the eye 60 of the hasp 54 to produce the engaged hasp 56. The shackle 82 of the padlock 80 is inserted through the hasp staple 58 and locked. The battery box hold-down 10 then lockingly affixes and secures the battery box 18 and any battery (not shown) enclosed therein to the base 12 to minimize vibration and deter theft thereof.

The shock-absorbent lining 43, 52, 84, preferably a polymeric organic material, of the metal strips 20, 42, 70, inside surfaces 22, 46, 72 particularly serves to minimize vibration during trailer 16 movement and also to inhibit lateral sliding of the battery box 18.

The metal strips 20, 42, 70 and associated components are preferably fabricated from steel. For servicing the battery the second metal strip 42 may be removed by a reversal of the above described procedure and, if the battery box 18 has a removable top, this top removed.

Changes may be made in the construction, operation and arrangement of the various parts, elements, steps and procedures described herein without departing from the concept and scope of the invention as defined in the following claims.

What is claimed is:

1. A battery box hold-down for securing a battery box to a base, the device comprising:
    a first metal strip with a shape congruous to one side of the battery box and comprising an inside surface, a first end attachable to the base and a second end;
    a slip-joint hinge comprising two reversibly joinable components, a first component being attached near the second end of the first metal strip;
    a second metal strip with a shape congruous to a top of the battery box, and comprising an inside surface, a first end having a second component of the slip-joint hinge attached nearby to facilitate the reversible engagement of the first metal strip with the second metal strip, and a second end;
    a hasp attached near the second end of the second metal strip;
    a third metal strip with a shape congruous to a second side of the battery box and comprising an inside surface, an outside surface, a first end and a second end attachable to the base; and
    a hasp staple attached to the outside surface of the third metal strip near the first end thereof to facilitate a sliding engagement with the hasp.

2. The battery box hold-down of claim 1 characterized further to include a hinge on both the first end of the first metal strip and the second end of the third metal strip for connection to the base.

3. The battery box hold-down of claim 1 wherein the inside surfaces of the metal strips are defined further as having a layering of flexible, shock-absorbent material.

4. The battery box hold-down of claim 3 wherein the flexible shock-absorbent material is defined further as being a polymeric organic material.

5. The battery box hold-down of claim 1 wherein the first component of the slip-joint hinge is defined further as being a laterally disposed socket and the second component of the slip-joint hinge is defined further as being a laterally disposed pintle, these two slip-joint components being engagable in a removable position and a fixed position for facilitating the reversible engagement of the first metal strip to the second metal strip.

6. The battery box hold-down of claim 1 wherein the hasp is defined further as comprising a hasp eye and as being hingedly attached near the second end of the second metal strip.

7. The battery box hold-down of claim 1 wherein the hasp staple is defined further as being positioned to facilitate the sliding engagement of the hasp eye with the hasp staple and allowing the locking engagement of a padlock shackle to securedly assemble the metal strips and thus lock an emplaced battery box to the base.

8. The battery box hold-down of claim 1 wherein the metal strips are defined further as being steel.

* * * * *